United States Patent [19]
Sugimoto et al.

[11] Patent Number: 5,236,399
[45] Date of Patent: Aug. 17, 1993

[54] SILENT CHAIN

[75] Inventors: Yoshiaki Sugimoto; Hiroki Ishida, Tokorozawa; Toshihiro Hosokawa, Takatsuki; Nobuyuki Fujimoto, Hanno, all of Japan

[73] Assignee: Tsubakimoto Chain Co., Osaka, Japan

[21] Appl. No.: 801,534

[22] Filed: Dec. 2, 1991

[30] Foreign Application Priority Data
Nov. 30, 1990 [JP] Japan .............................. 2-126444[U]

[51] Int. Cl.$^5$ ............................................... F16G 1/22
[52] U.S. Cl. .................................................... 474/215
[58] Field of Search ........................ 474/206, 212-217

[56] References Cited
U.S. PATENT DOCUMENTS
4,507,106 3/1985 Cole, Jr. ............................ 474/215
4,801,289 1/1989 Sugimoto et al. .................. 474/215

Primary Examiner—Thuy M. Bui
Attorney, Agent, or Firm—Flynn, Thiel, Boutell & Tanis

[57] ABSTRACT

A rocker-joint silent chain in which the pin insertion holes for each link have rocker-joint connecting pin means extending therethrough. Each pin insertion hole has two opposed, spaced-apart surfaces each having the cross-section form of arcs of uniform radius. The centers of curvature of said two surfaces are offset from one another so that they define an arcuate, but noncircular, cavity which is effective to wedge said connecting pin in load-transmitting relationship to its associated link when the chain is driven.

5 Claims, 3 Drawing Sheets

R1=R2

R1≒R2
(R1>R2)

R1=R2

R1≒R2
(R1<R2)

R1=R2

R1≒R2
(R1<R2)

R1 R2

R1≒R2
(R1<R2)

SILENT CHAIN

BACKGROUND OF THE INVENTION

1. Field of the Invention

The present invention relates to a power transmission chain of the inverted tooth type, commonly referred to as a "silent chain". The silent chain is utilized as a driving force transmitting apparatus in which a wrapping and meshing transmission is effected by use of an endless chain.

2. Description of the Prior Art

A silent chain is generally constructed, as illustrated in FIG. 1, by connecting, in endless fashion, a plurality of link plates L by means of connecting pins P. Each of the link plates L has teeth which are adapted to mesh with a sprocket S and also has a pair of connecting pin insertion holes H.

The configurations of the connecting pins are divided broadly into (1) a rocker-joint type connecting pin means consisting of a seat pin and a rocker pin and (2) a round pin type connecting pin of circular cross section. The rocker-joint type connecting pin (hereinafter referred to merely as a connecting pin) is more commonly employed in silent chains.

The present invention relates to a silent chain in which the link plates are connected by the connecting pins such as, for example, a silent chain connected by the connecting pins as disclosed in the Official Gazette of Laid-open Japanese patent application No. 62-101940 (1987) As shown in FIG. 3, a traction load-transmitting, side, inner surface H' of a connecting pin insertion hole H provided on a toothed link plate L is formed in the shape of a convex surface protruding toward the inside of the insertion hole H so that the seat pin P' can be prevented from being rotated by virtue of the convex surface.

That is, the connecting pin insertion hole is designed so as not to cause mutual slippage on the connecting surface between the insertion hole H and the seat pin P', when the link plate L is meshed with the sprocket and is bent around the sprocket in accordance with the rotation of the sprocket, in order to achieve a rolling contact at the mutually contacting back surfaces between the seat pin and the rocker pin.

In the above-described prior art, since the connecting pin insertion hole is formed with a convex surface, which is provided for preventing rotational displacement, there is formed a rotation stopping corner portion D which is nonlinearly formed at the connecting point or junction of the concave surface and the convex surface formed on the inner periphery of the insertion hole. As a result, there is caused the problem that a crack is likely to be generated in the link plate, said crack extending from the rotation stopping corner portion D, due to the application of the load acting for preventing the mutual rotation which concentrates force on the rotation stopping corner portion D. Such cracking can result in a breaking of the link plate.

SUMMARY OF THE INVENTION

In order to resolve the above problem encountered in the above-described prior art, the present invention avoids forming the rotation stopping corner portion D. Instead, a traction load-transmitting, side, inner surface of the connecting pin insertion hole is formed into a nonload-transmitting surface portion which does not contact the connecting pin and a load-transmitting concave surface portion which is continuously connected at each end with a respective end of the nonload-transmitting surface portion and is contacted and coupled with the connecting pin. The load-transmitting concave surface portion consists of two, circular arc, concave surfaces each of which has a different center of circular arc and is disposed in such a manner that the two, circular arc, concave surfaces face each other so as to form a wedge-shape cavity therebetween.

A pair of connecting pin insertion holes are provided on the toothed link plate. Each insertion hole has an inner peripheral surface formed with two, circular arc, concave surfaces facing each other, each having a different center of circular arc, at the traction load-transmitting surface side thereof. The two, circular arc, concave surfaces are located so as to form a wedge-shaped configuration. Therefore, the outer surfaces of a seat pin contacting and coupling with these two, circular arc, concave surfaces are forced to enter into the space between the two, circular arc, concave surfaces upon an application of a traction load. Thus, it becomes impossible to cause mutual rotational displacement between the traction load-transmitting inner surface of the connecting pin insertion hole and the traction load-transmitting outer surface of the seat pin which are coupled with each other in a wedge-shaped cavity. Furthermore, a load causing the mutual rotational displacement stopping force is evenly loaded on all the contacting surfaces of the pins and holes as a dispersed wedge stopping force and is not being loaded on a particular location of very small area as a concentrated force.

DESCRIPTION OF PREFERRED EMBODIMENT

Figure 1:
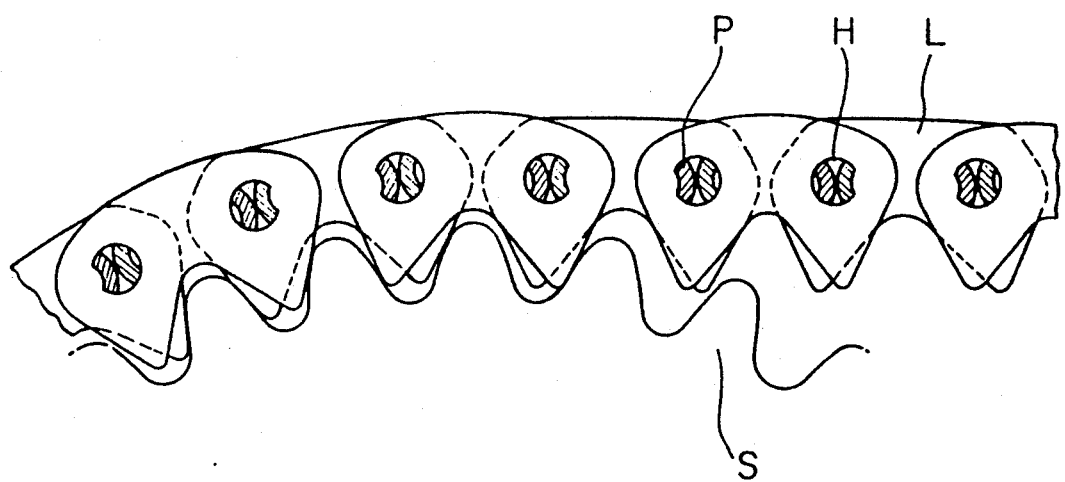
FIG. 1 is a view of a prior art silent chain and illustrating the meshing relationship between the silent chain and a sprocket.
Figure 2:
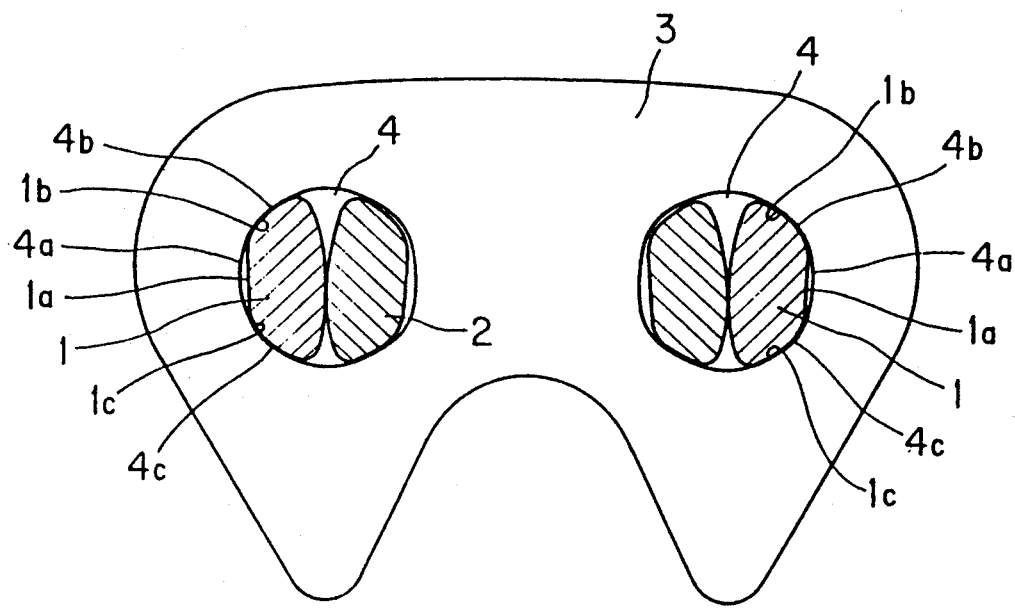
FIG. 2 is an enlarged front view showing a toothed link plate in accordance with the present invention.
Figure 3:
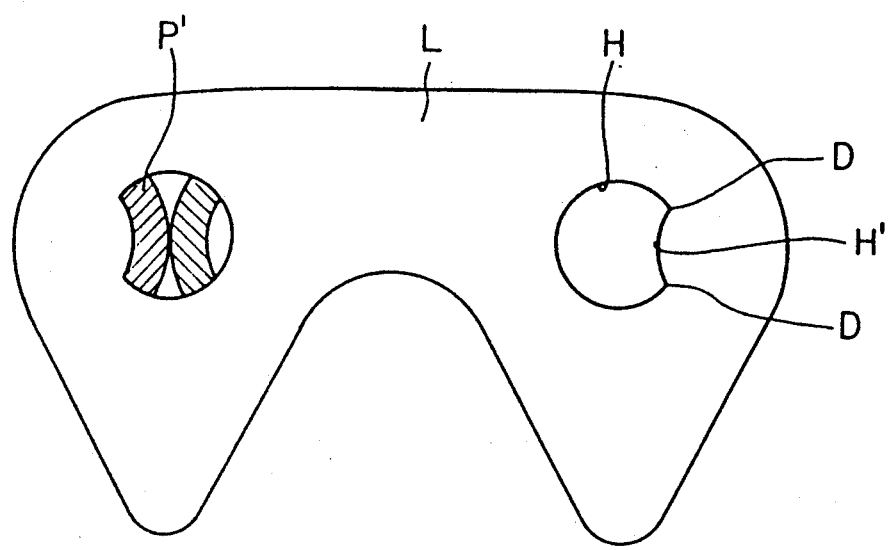
FIG. 3 is an enlarged front view showing a toothed link plate in the prior art silent chain.

FIG. 2 is an enlarged front view showing a toothed link plate 3 in which a connecting pin structure comprising a seat pin 1 and a rocker pin 2 is inserted into a connecting pin insertion hole 4 formed on the toothed link plate 3. A traction load-transmitting, side, inner surface of the connecting pin insertion hole 4 is formed into a nonload-transmitting surface portion 4a which does not contact the seat pin 1 and two load-transmitting, concave, surface portions 4b and 4c, each of which is continuously and smoothly merged at each end with a respective end of the nonload-transmitting surface portion 4a. The two load-transmitting concave surface portions 4b and 4c are contacted and coupled with the connecting pin 1. The two load-transmitting, concave surface portions 4b and 4c consist of two, circular arc, concave surfaces, each of which has a different center of circular arc and is disposed in such a manner that the two, circular arc, concave surfaces face each other so as to form a wedge-shape cavity. Moreover, the traction load-transmitting, side, outer surface of the seat pin 1 is comprised of a nonload-transmitting surface portion 1a which faces and is spaced from the nonload-transmitting surface portion 4a and two, circular arc, convex surfaces 1b and 1c which have different centers of circular arc and are contacted and coupled with the load-transmitting, concave, surface portions 4b and 4c, respectively. The surfaces 1b and 1c of the seat pin 1 are complementary to the respective concave surface portions 4b and 4c of the pin insertion hole. The convex surface 1b has the same radius and center of curvature as the concave surface portion 4b. The convex surface 1c has the same radius and center of curvature as the concave surface portion 4c. The surface portion 1a can be of optional shape provided that it is spaced from surface portion 4a.

FIGS. 4(a) through 4(h) illustrate various representative ways of shaping the surface portions 1b, 1c and surface portions 4b, 4c. It will be noted that the radius R1 of surface portions 1b and 4b can be the same as, or different from, the radius R2 of surface portions 1c and 4c. The center of curvature 01 of radius R1 is offset, vertically and/or horizontally, from the center of curvature 02 of radius R2. Thus, the surfaces 1b and 4b, on the one hand, and surfaces 1c and 4c, on the other hand, are not concentric, but rather, they converge toward each other to form a wedge-shaped zone therebetween which narrows in a direction toward the central surface portions 1a, 4a.

Figure 4A:
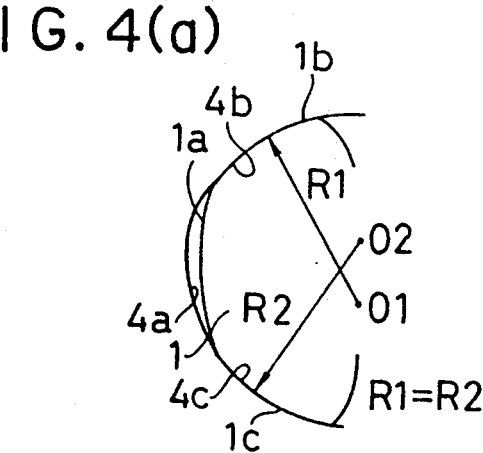
FIGS. 4(a) through 4(h) illustrate various representative ways of shaping the two load-transmitting, concave, surface portions of the pin insertion hole and the two convex surface portions of the seat pin.
Figure 4E:
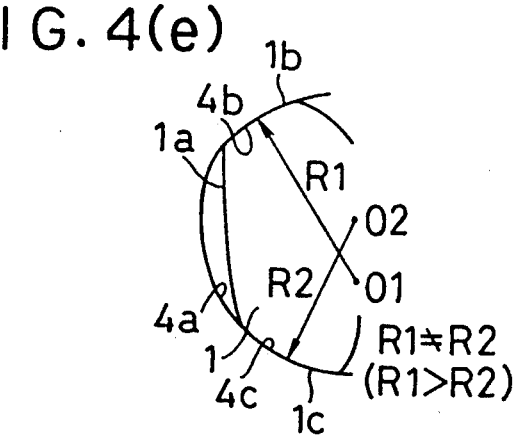
Figure 4B:
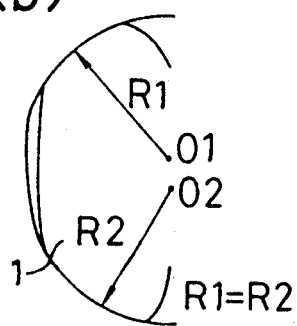
Figure 4F:
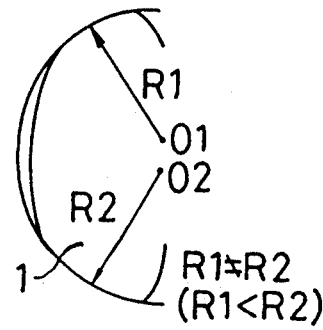
Figure 4C:
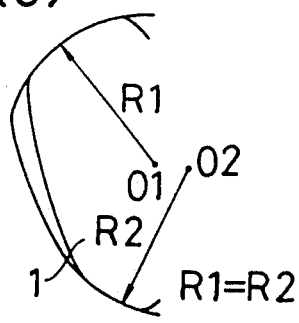
Figure 4G:
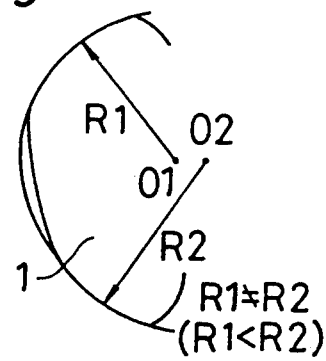
Figure 4D:
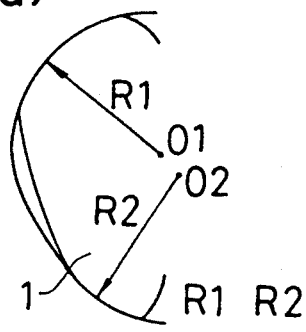
Figure 4H:
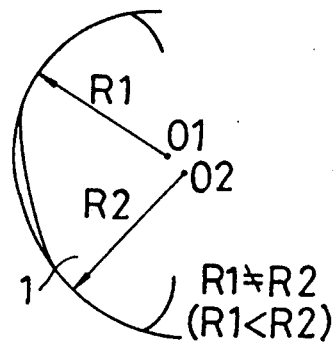

Referencing specifically FIGS. 4(a) and 4(e), the generally opposed concave surface portions 4b and 4c are respectively formed by the radii R1 and R2, which are respectively generated about the center 01 and 02. These centers 01 and 02 are, as shown in these figures, vertically spaced from one another so that the center 02 used for generating surface 4b is positioned more closely adjacent the surface 4c, and likewise the center 02 used for generating the surface 4c is positioned more closely adjacent the surface 4b, whereby the radii R1 and R2 intersect one another during generation of the surfaces 4b and rc. These centers 02 and 01 are effectively disposed on opposite sides of a line which extends through the center of the insertion hole in the longitudinal direction of the link, and in fact the centers 01 and 02 are individually disposed on the opposite side of this centerline from the respective concave surfaces 4b and 4c. The arrangements of FIG. 4(a) and 4(e) are generally the same except that the radii R1 and R2 in FIG. 4a are equal, whereas the radii R1 and R2 in FIG. 4e are no equal.

Accordingly, when a traction force is loaded on the chain, the circular arc, convex surfaces 1b and 1c of the seat pin 1 are forced to enter into the space between the two load-transmitting, concave surface portions 4b and 4c which face oppositely so as to form a wedge-shape cavity on the inner periphery of the connecting pin insertion hole 4. Furthermore, since there is provided a clearance between the nonload-transmitting surface portion 1a of the seat pin 1 and nonload-transmitting surface portion 4a of the connecting pin insertion hole 4, the insertion is carried out in such a manner that all the wedging surfaces are contacted and coupled, and therefore, the mutual rotational displacement stopping force acting on the link plate and the seat pin is loaded on all the surfaces of both the circular arc, convex surfaces 1b and 1c of the seat pin and the load-transmitting, concave surface portions 4b and 4c of the connecting pin insertion hole. Thus, concentrated loading of the mutual rotational displacement stopping force on a particular place of small area is prevented.

In accordance with the present invention, the mutual rotational displacement between the link plate and the seat pin is prevented by a wedged locking mechanism defined by the contacting and coupling surfaces therebetween. Therefore, the rotational stopping load is evenly loaded on all of the relatively large, wedge-shaped coupling surface area without being concentrated on a particular place. Accordingly, the link plate will be less likely to crack at the connecting pin insertion hole. Thus, breaking of the link plate is prevented and the mutual rotational displacement between the link plate and the seat pin is avoided.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A silent chain which comprises a plurality of link plates, each link plate having a plurality of teeth and being connected at its opposite ends to adjacent link plates by means of a pair of rocker-joint connecting pins, said link plate having a rocker-joint connecting pin insertion hole, a traction load-transmitting, side, inner surface of said rocker-joint connecting pin insertion hole being formed into a nonload-transmitting surface portion which does not contact the rocker-joint connecting pin and two load-transmitting concave surface portions which are located on opposite ends of said nonload-transmitting surface portion, are continuously connected thereto and extend away therefrom and are contacted and coupled with a rocker-joint connecting pin disposed in said insertion hole and contacting said concave surface portions, said load-transmitting concave surface portions consisting essentially of two, circular arc, concave surfaces which have different centers of curvature, said two, circular arc, concave surfaces facing each other so as to form a wedge-shape portion of said pin insertion hole.

2. A silent chain of the rocker-joint type, comprising an endless series of elongated links each having inverted teeth thereon, rocker-joint connecting structures connecting each link to the adjacent links at opposite longitudinal ends thereof, respectively, each of said rocker-joint connecting structures comprising a pin insertion hole having a rocker pin extending therethrough in the longitudinally inner section of said hole and a seat pin extending therethrough in the longitudinally outer section of said hole, the inner periphery of said hole having a closed, continuous, smoothly curved, concave surface free of convexities, said seat pin and said rocker pin having adjacent, transversely extending surfaces which rockably contact each other so that said seat pin can rock with respect to said rocker pin, said longitudinally outer section of said hole consisting of a concave, central, circumferential surface portion and two concave, end, circumferential surface portions which extend smoothly and continuously in opposite circumferential directions away from the opposite circumferential ends of said central surface portion, said concave end surface portions being disposed in opposed relation to each other and having the cross-sectional shape of circular arcs in which the centers of curvature of the respective circular arcs are offset from each other so that said end surface portions define therebetween a cavity which has a continuous smooth wall, is noncircular in cross-section and forms a wedge zone, said seat pin having a central, circumferential surface portion which is opposed to and is spaced inwardly from said concave, central, surface portion of said hole so as to be in non-load-transmitting relationship thereto, said seat pin having two convex, end, circumferential surface portions extending smoothly and continuously in opposite circumferential directions away from the opposite circumferential ends of said central surface portion, said convex end portions of said seat pin being disposed between, being opposed to and contacting said concave end surface portions of said hole, said convex end portions of said seat pin having the same size and shape as said concave end surface portions of said holes, respectively, so as to be complementary thereto whereby said seat pin can be wedged in said wedge zone with said convex end portions of said pin being in load-transmitting relationship to said concave end surface portions of said hole.

3. A silent chain comprising:

a plurality of link plates, each link plate having a plurality of teeth and being connected at its opposite ends to adjacent link plates by a pair of rocker-joint connecting pins, said link plate having a rocker-joint connecting pin insertion hole;

said insertion hole defining a traction load-transmitting side inner surface having a central non-load-transmitting surface portion which does not contact the rocker-joint contacting pin and two load-transmitting concave surface portions which are located on opposite ends of said nonload-transmitting surface portion, said two load-transmitting concave surface portions being continuously connected to and extending away from opposite ends of said non-load transmitting surface portion, said two load-transmitting concave surface portions being contacted and coupled with a rocker-joint connecting pin disposed in said insertion hole;

said load-transmitting concave surface portions consisting essentially of first and second circular arc concave surfaces which are generated respectively about first and second radii which respectively have different first and second centers of curvature, said first and second circular arc concave surfaces facing each other so as to form a wedge-shaped portion of said pin insertion hole, and said first and second centers of curvature being spaced apart from one another generally toward the opposite concave surfaces so that said first and second radii intersect during generation of the respective first and second concave surfaces.

4. A silent chain according to claim 3, wherein said first and second radii are equal.

5. A silent chain according to claim 3, wherein said first and second radii are unequal.

* * * * *